United States Patent
Fuji

(10) Patent No.: US 11,892,328 B2
(45) Date of Patent: Feb. 6, 2024

(54) MEASURING INSTRUMENT, OPTICAL READER AND OPTICALLY-READABLE MEASURE

(71) Applicant: FUJITSU COMPONENT LIMITED, Tokyo (JP)

(72) Inventor: Koichiro Fuji, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 111 days.

(21) Appl. No.: 17/089,054

(22) Filed: Nov. 4, 2020

(65) Prior Publication Data

US 2021/0049335 A1 Feb. 18, 2021

Related U.S. Application Data

(62) Division of application No. 16/414,108, filed on May 16, 2019, now Pat. No. 10,860,824.

(30) Foreign Application Priority Data

Jun. 1, 2018 (JP) ................................. 2018-106211

(51) Int. Cl.
  *G01D 5/347* (2006.01)
  *G06K 7/12* (2006.01)

(52) U.S. Cl.
  CPC ........... *G01D 5/34792* (2013.01); *G06K 7/12* (2013.01)

(58) Field of Classification Search
  CPC .................................................. G01D 5/34792
  USPC ........................................................ 235/469
  See application file for complete search history.

(56) References Cited

U.S. PATENT DOCUMENTS

| | | | |
|---|---|---|---|
| 5,173,602 A | 12/1992 | Lin | |
| 5,773,814 A * | 6/1998 | Phillips | H04N 1/00795 |
| | | | 250/226 |
| 5,880,683 A | 3/1999 | Brandestini | |
| 7,445,160 B2 | 11/2008 | Ruckenstein et al. | |
| 9,438,867 B2 * | 9/2016 | Wang | H04N 9/04551 |
| 10,504,230 B1 | 12/2019 | Stahl et al. | |

(Continued)

FOREIGN PATENT DOCUMENTS

| | | |
|---|---|---|
| CN | 102855511 | 1/2013 |
| CN | 104339892 | 2/2015 |

(Continued)

OTHER PUBLICATIONS

Notice of Allowance, dated Feb. 3, 2022, in U.S. Appl. No. 16/679,931 (9 pp.).

(Continued)

*Primary Examiner* — Rafferty D Kelly
(74) *Attorney, Agent, or Firm* — STAAS & HALSEY LLP

(57) ABSTRACT

A measuring instrument includes: a measure on which a code having color patterns is printed; a plurality of first readers that optically read colors of first ranges in first patterns corresponding to digits except a least significant digit among the color patterns, the first ranges in the first patterns being arranged in a second direction; and a plurality of second readers that optically read colors of second ranges in second patterns arranged in a first direction corresponding to patterns of the least significant digit among the color patterns, the second ranges being arranged in the first direction at an interval different from a width of the pattern in the first direction.

4 Claims, 18 Drawing Sheets

(56) References Cited

U.S. PATENT DOCUMENTS

| | | | |
|---|---|---|---|
| 2004/0182930 | A1 | 9/2004 | Nojiri |
| 2005/0200857 | A1 | 9/2005 | Christ, Jr. et al. |
| 2006/0109579 | A1 | 5/2006 | Asakura et al. |
| 2009/0162112 | A1 | 6/2009 | Murayama |
| 2012/0026321 | A1 | 2/2012 | Hasler et al. |
| 2013/0001310 | A1 | 1/2013 | Miyazaki et al. |
| 2015/0029291 | A1 | 1/2015 | Nakajima et al. |
| 2015/0235118 | A1 | 8/2015 | Simske et al. |
| 2017/0353611 | A1 | 12/2017 | Koyama |

FOREIGN PATENT DOCUMENTS

| | | |
|---|---|---|
| CN | 107454280 | 12/2017 |
| DE | 202004008829 | 9/2004 |
| EP | 0560520 | 9/1993 |
| EP | 0635700 A1 | 1/1995 |
| JP | 5272916 | 10/1993 |
| JP | 7-35535 | 2/1995 |
| JP | 7167675 | 7/1995 |
| JP | 7294238 | 11/1995 |
| JP | 2005-274567 | 10/2005 |
| JP | 2006-147112 | 6/2006 |
| JP | 200975013 | 4/2009 |
| JP | 201263344 | 3/2012 |
| WO | WO9630217 | 10/1996 |

OTHER PUBLICATIONS

Datagenetics, Gray Code, Nov. 3, 2014, DataGenetics.com/blog/november32014/index.html (Year: 2014) (4 pp.).

Office Action, dated May 28, 2020, in U.S. Appl. No. 16/679,931 (7 pp.).

M.C. ER: "On Generating the N-ary Reflected Gray Codes," IEEE Transactions on Computers, vol. C-33, No. 8, Aug. 1984, pp. 739-741.

Extended European Search Report, dated Oct. 21, 2019, in European Application No. 19174201.4 (14 pp.).

Office Action, dated Jan. 24, 2019, in U.S. Appl. No. 16/177,706 (8 pp.).

Notice of Allowance, dated May 18, 2020, in U.S. Appl. No. 16/177,706 (9 pp.).

Office Action, dated Oct. 3, 2019, in U.S. Appl. No. 16/177,706 (6 pp.).

Office Action, dated May 21, 2020, in U.S. Appl. No. 16/414,108 (5 pp.).

Notice of Allowance, dated Aug. 5, 2020, in U.S. Appl. No. 16/414,108 (37 pp.).

U.S. Appl. No. 16/177,706, filed Nov. 1, 2018, Koichiro Fuji, Fujitsu Component Limited.

U.S. Appl. No. 16/679,931, filed Nov. 11, 2019, Koichiro Fuji, Fujitsu Component Limited.

U.S. Appl. No. 16/414,108, filed May 16, 2019, Koichiro Fuji, Fujitsu Component Limited.

Final Office Action, dated Feb. 2, 2021, in U.S. Appl. No. 16/679,931 (41 pp.).

Office Action, dated Jun. 24, 2021, in U.S. Appl. No. 16/679,931 (7 pp.).

Office Action, dated Sep. 14, 2022, in corresponding Chinese Patent Application No. 201910469596.2 (11 pp.).

Office Action, dated Oct. 4, 2022, in related Japanese Patent Application No. 2021-185047 (12 pp.).

* cited by examiner

FIG. 4

| DECIMAL | DIGIT NUMBER | | | | | |
|---|---|---|---|---|---|---|
| NUMBER | 1 | 2 | 3 | 4 | 5 | 6 |
| 0 | 0 | 0 | 0 | 0 | 0 | 0 |
| 1 | 0 | 0 | 0 | 0 | 0 | 1 |
| 2 | 0 | 0 | 0 | 0 | 0 | 2 |
| 3 | 0 | 0 | 0 | 0 | 1 | 2 |
| 4 | 0 | 0 | 0 | 0 | 1 | 0 |
| 5 | 0 | 0 | 0 | 0 | 1 | 1 |
| 6 | 0 | 0 | 0 | 0 | 2 | 1 |
| 7 | 0 | 0 | 0 | 0 | 2 | 2 |
| 8 | 0 | 0 | 0 | 0 | 2 | 0 |
| 9 | 0 | 0 | 0 | 1 | 2 | 0 |
| 10 | 0 | 0 | 0 | 1 | 2 | 1 |
| 11 | 0 | 0 | 0 | 1 | 2 | 2 |
| 12 | 0 | 0 | 0 | 1 | 0 | 2 |
| 13 | 0 | 0 | 0 | 1 | 0 | 0 |
| 14 | 0 | 0 | 0 | 1 | 0 | 1 |
| 15 | 0 | 0 | 1 | 1 | 1 | 1 |
| 16 | 0 | 0 | 1 | 1 | 1 | 2 |
| 17 | 0 | 0 | 1 | 1 | 1 | 0 |

□ = WHITE
▨ = BLUE
▩ = BLACK (a) CASE OF READING REGION 27

DIGIT NUMBER 1 : 2.0V → 「0」
DIGIT NUMBER 2 : 2.0V → 「0」
DIGIT NUMBER 3 : 2.0V → 「0」
DIGIT NUMBER 4 : 1.5V → 「1」
DIGIT NUMBER 5 : 1.0V → 「2」
DIGIT NUMBER 6 : 1.5V → 「1」
⇩
TERNARY GRAY CODE 「000121」
⇩
CONVERSION INTO DECIMAL NUMBER
⇩
MEASUREMENT VALUE IS 10

(b) CASE OF READING REGION 28

DIGIT NUMBER 1 : 2.0V → 「0」
DIGIT NUMBER 2 : 2.0V → 「0」
DIGIT NUMBER 3 : 2.0V → 「0」
DIGIT NUMBER 4 : 2.0V → 「0」
DIGIT NUMBER 5 : 1.5V → 「1」
DIGIT NUMBER 6 : 1.5V → 「1」
⇩
TERNARY GRAY CODE 「000011」
⇩
CONVERSION INTO DECIMAL NUMBER
⇩
MEASUREMENT VALUE IS 5

FIG. 13

| 32b | SUM OF 30 | 34a | 32a | 32c | 34c | CORRECTION VALUE TO BE ADD |
|---|---|---|---|---|---|---|
| 2 | ODD | 0 | 1 | 1 | 0 | -P3 |
|   |   | 1 | 2 | 1 | 0 | 0 |
|   |   | 1 | 2 | 0 | 0 | +P3 |
| 1 | ODD | 1 | 2 | 0 | 0 | -P3 |
|   |   | 2 | 2 | 0 | 0 | 0 |
|   |   | 2 | 2 | 0 | 1 | +P3 |
| 0 | ODD | 2 | 2 | 0 | 1 | -P3 |
|   |   | 2 | 1 | 0 | 1 | 0 |
|   |   | 2 | 1 | 1 | 2 | +P3 |
| 0 | EVEN | 2 | 1 | 1 | 2 | -P3 |
|   |   | 1 | 0 | 1 | 2 | 0 |
|   |   | 1 | 0 | 2 | 2 | +P3 |
| 1 | EVEN | 1 | 0 | 2 | 2 | -P3 |
|   |   | 0 | 0 | 2 | 2 | 0 |
|   |   | 0 | 0 | 2 | 1 | +P3 |
| 2 | EVEN | 0 | 0 | 2 | 1 | -P3 |
|   |   | 0 | 1 | 2 | 1 | 0 |
|   |   | 0 | 1 | 1 | 0 | +P3 |

FIG. 15

| 32b | SUM OF 30 | 34a | 32a | 32c | 34c | CORRECTION VALUE TO BE ADD |
|---|---|---|---|---|---|---|
| 2 | ODD | 0 | 1 | 1 | 0 | −P3 |
| | | 1 | 2 | 1 | 0 | 0 |
| | | 1 | 2 | 0 | 0 | +P3 |
| 1 | ODD | 1 | 2 | 0 | 0 | −P3 |
| | | 2 | 2 | 0 | 0 | 0 |
| | | 2 | 2 | 0 | 1 | +P3 |
| 0 | ODD | 2 | 2 | 0 | 1 | −P3 |
| | | 2 | 1 | 0 | 1 | 0 |
| | | 2 | 1 | 1 | 2 | +P3 |
| 0 | EVEN | 2 | 1 | 1 | 2 | −P3 |
| | | 1 | 0 | 1 | 2 | 0 |
| | | 1 | 0 | 2 | 2 | +P3 |
| 1 | EVEN | 1 | 0 | 2 | 2 | −P3 |
| | | 0 | 0 | 2 | 2 | 0 |
| | | 0 | 0 | 2 | 1 | +P3 |
| 2 | EVEN | 0 | 0 | 2 | 1 | −P3 |
| | | 0 | 1 | 2 | 1 | 0 |
| | | 0 | 1 | 1 | 0 | +P3 |

MEASURING INSTRUMENT, OPTICAL READER AND OPTICALLY-READABLE MEASURE

CROSS-REFERENCE TO RELATED APPLICATION

This application is Divisional Application of U.S. application Ser. No. 16/414,108 filed on May 16, 2019 which claims the benefit of priority of the prior Japanese Patent Application No. 2018-106211 filed on Jun. 1, 2018, the entire contents of each of which are incorporated herein by reference.

FIELD

A certain aspect of the embodiments is related to a measuring instrument, an optical reader, and an optically-readable measure.

BACKGROUND

When cloths are made or resized in a clothing store, a clerk generally measures dimensions of the cloths using a measure. The clerk enters the measurement data in a dimension sheet of each customer by hand, and then manually inputs the measurement data to a terminal of the store. In this case, the work for entering the measurement data in the dimension sheet and the work for inputting the measurement data to the terminal are required, and therefore double labors occur.

In order to solve this problem, there has been known an apparatus which can input the measurement data to the terminal without using the dimension sheet (e.g. see Patent Document 1: Japanese Laid-open Patent Publication No. 7-35535). The apparatus includes: a transmitter that has a measure measuring the dimensions of a measurement object, and transmits the measurement data; and a measure signal receiver and recorder that receives a signal including the measurement data transmitted from the transmitter and prints the measurement data. In the transmitter, a binary code comprised of white dots and black dots printed on the measure is read optically by a reader, the read data is decoded, and the decoded data is transmitted to the receiver and recorder.

Similarly, there have been known a length measuring instrument and a position measuring instrument that optically read patterns such as binary digital codes (e.g. see Patent Document 2: Japanese Laid-open Patent Publication No. 2009-75013, and Patent Document 3: Japanese Laid-open Patent Publication No. 5-272916).

SUMMARY

According to an aspect of the present invention, there is provided a measuring instrument including: a measure on which a code having a plurality of color patterns is printed, each of the color patterns having a plurality of digits to which values of a N-ary number are assigned (N is 3 or more), one of different colors respectively corresponding to one of N-ary values being assigned to each pattern corresponding to each digit included in each color pattern, the pattern corresponding to each digit being arranged in a second direction intersecting a first direction, a humming distance between adjacent color patterns in the first direction being 1, and an amount of change in the value at one of the digits included in the adjacent color patterns being 1; a plurality of first readers that optically read colors of first ranges in a plurality of first patterns corresponding to digits except a least significant digit among the color patterns, respectively, the first ranges in the first patterns being arranged in the second direction; and a plurality of second readers that optically read colors of second ranges in a plurality of second patterns arranged in the first direction corresponding to patterns of the least significant digit among the color patterns, respectively, the second ranges being arranged in the first direction at an interval different from a width of the pattern in the first direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a reading processing of the color pattern by the ternary Gray code;

FIG. 13 is a diagram illustrating a table used in the first embodiment;

FIG. 15 is a diagram illustrating a table used in the first variation of the first embodiment;

DESCRIPTION OF EMBODIMENTS

In the above-mentioned conventional measuring instrument, it is required to suppress increase in size and improve a reading accuracy.

Hereinafter, a description will be given of the present embodiment of the present invention with reference to the drawings.

Figure 1:
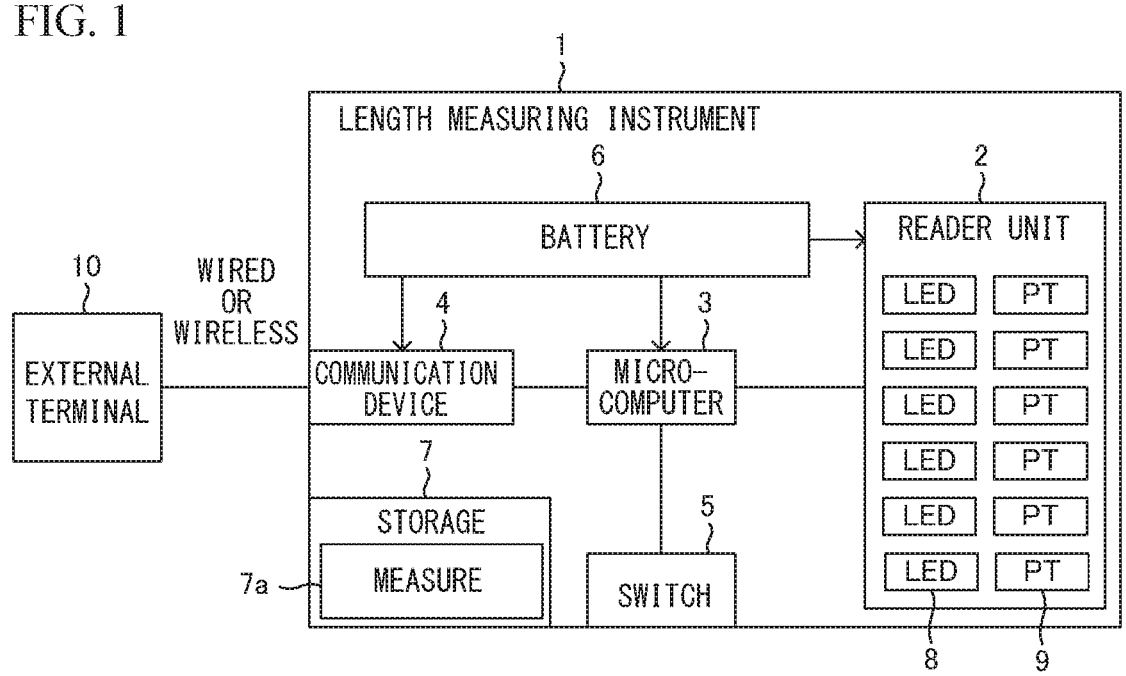
FIG. 1 is a diagram illustrating the configuration of a length measuring instrument according to a present embodiment.

FIG. 1 is a diagram illustrating the configuration of a length measuring instrument according to a present embodiment. In one example, the length measuring instrument may be used in a clothing store, but may be used for any other purposes.

A length measuring instrument (hereinafter referred to as "a measuring instrument") 1 includes: a reader unit 2 that reads a color pattern from a measure 7a having multi-digit color patterns; a microcomputer 3 as a measuring means that calculates a length of a measurement object from data read by the reader unit 2; a communication device 4 that transmits data of the calculated length of the measurement object to an external terminal 10 by wired or wireless communication; a switch 5 that instructs the start of the measurement to the microcomputer 3; a battery 6 that supplies an electric power to the reader unit 2, the microcomputer 3 and the communication device 4; and a storage 7 that stores the measure 7a.

The measuring instrument 1 and the external terminal 10, or the measuring instrument 1 alone, may configure a measuring system for measuring and determining a length of a measurement subject. In the latter case, the measuring instrument 1 may perform functions of the external terminal 10 that are described herein. The measuring system may further include other devices such as a server, a storage device, or any type of communication devices. The measuring system may have functions for storing measured lengths, or processing the measured lengths for certain purposes such as making clothes for example. These functions are realized by executing software in the external terminal 10 or other devices.

The reader unit 2 includes: light emitting diodes (LEDs) 8 each of which irradiates the color pattern with a light; and phototransistors (PTs) 9 each of which receives a reflection light from the color pattern, and converts it into a current or voltage with a value corresponding to a receiving light amount. The LED 8 is irradiated with light, including infrared, a visible light and an ultraviolet light. The PT 9 receives the light reflected by the color pattern. A set of the LED 8 and the PT 9 corresponds to the reader unit described later. The LED 8 is used as a light emitting element, and the PT 9 is used as a light receiving element. However, a light emitting element other than the LED 8 may be used, and a light receiving element other than the PT 9 may be used.

The microcomputer 3 is a processor such as a central processing unit (CPU). The microcomputer 3 controls on/off of the LED 8, and reads the current value or voltage value of the output from the PT 9. Since the reflectivities are different by the colors of the color patterns, and the light receiving amount of the PT 9 varies depending on the reflectivities, the microcomputer 3 is capable of determining the color by the current value or voltage value output from the PT 9. When the voltage values output from the PT 9 are 2.0V, 1.5V and 1.0V, for example, the microcomputer 3 determines that the colors of the color pattern are white, blue and black, respectively.

A scale is printed on a front surface of the measure 7a along a longitudinal direction as similar to a conventional measure, and the color pattern of the base N number Gray code (N-ary Gray code) using N colors (N>=3) is printed on a back surface of the measure 7a for each constant length, for example. The base N number Gray code is described later. Also, instead of using N different colors in each digit of the color pattern, the same color with N different concentrations may be used, for example. Here, the differences in such concentrations of the color pattern are also treated as "different colors". The storage 7 is removably attached to a housing of the measuring instrument 1. In FIG. 1, the measure 7a is housed in the storage 7. However, a measure may not be stored in storage or in a measuring instrument, as long as the measuring instrument can read color patterns on the measure. For instance, a measuring instrument may have a slit for slidably passing a measure.

The external terminal 10 is a terminal device such as a computer or smart phone having a wired or wireless communication function, receives the data of the length of the measurement object from the communication device 4, and registers and manages the data in the database. The database for registering the data of the length may be incorporated in the external terminal 10, or may be provided outside of the external terminal 10 in an accessible state. Further, softwares for processing the measured length may be stored in the external terminal 10 or in any other device in which the external terminal 10 is accessible.

Figure 2:
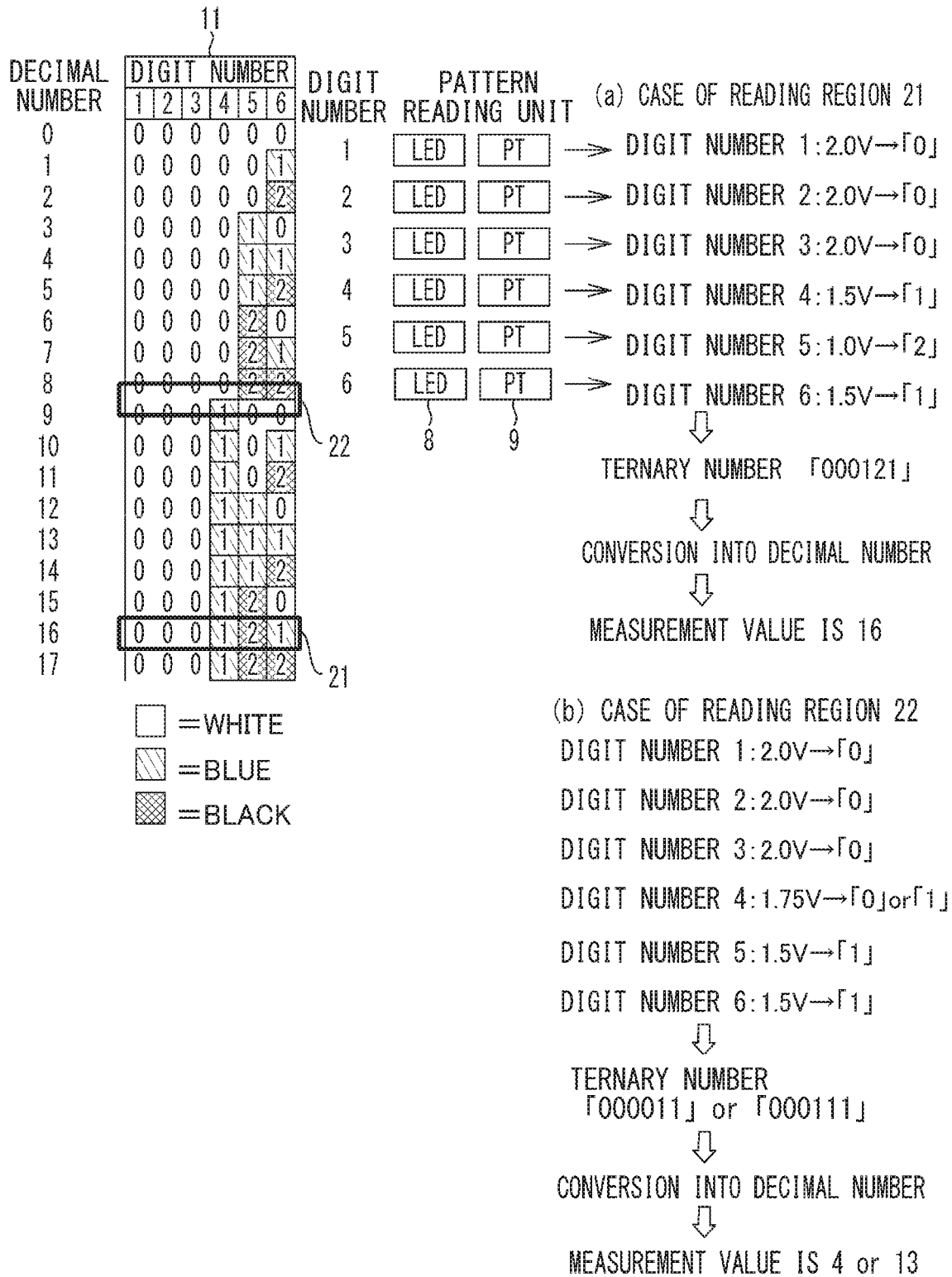
FIG. 2 is a diagram illustrating a reading processing of a color pattern of a ternary number.

FIG. 2 is a diagram illustrating a reading processing of a color pattern of a ternary number, In the example of FIG. 2, a color pattern 11 of the ternary number is composed of 6 digits, and three colors of white, blue and black are adopted as colors corresponding to ternary values "0", "1" and "2", respectively. The reflectivity is high in order of white, blue and black. Each line of the ternary color pattern 11 corresponds to certain decimal number as illustrated in FIG. 2, and each decimal number corresponds to a certain length. In FIG. 2, the decimal numbers are arranged in an ascending order, but the decimal numbers may be arranged in a descending order, for example. In FIG. 2, a value and a digit number of the ternary number corresponding to each color are described for convenience of explanation, but it is not necessary to show the value and the digit number of the ternary number in the actual color pattern or on the measure 7a. A voltage value output from the PT 9 is analog data. It is assumed that, when white, blue and black are read, voltage values output from the PT 9 are 2.0V, 1.5V and 1.0V, respectively.

A single set of the LED 8 and the PT 9 is assigned so as to read a single digit pattern of the color pattern 11. To read a measure with the six-digit color patterns illustrated in FIG. 2, at least six sets of the LED 8 and the PT 9 are provided in the measuring instruments 1.

When a region 21 of the color pattern 11 is read, each of the PTs 9 corresponding to white digit numbers 1 to 3 outputs 2.0V, each of the PTs 9 corresponding to blue digit numbers 4 and 6 outputs 1.5V, and the PT 9 corresponding to black digit number 5 outputs 1.0V. The microcomputer 3 determines the color of each digit based on the voltage value output from each of the PT 9, and converts the color into a corresponding ternary value. In an example of FIG. 2, the pattern in the region 21 is converted into a ternary value "000121". The microcomputer 3 calculates a length of a measurement object by converting the ternary value "000121" into a decimal value. In the region 21, the ternary value "000121" is converted into a decimal value "16", and may be further converted into a certain length corresponds to the decimal number "16". The read ternary value may be directly converted into a certain length data without converting into a decimal value. In FIG. 2, the value calculated from the reading result of the region 21 is identical with the value assigned to the region 21.

On the other hand, in the region 22, the color pattern 11 is read across two adjacent lines, i.e., a line corresponds to a decimal number "8" and a line corresponds to a decimal number "9". When the region 22 is read, each of the PTs 9 corresponding to the digit numbers 1 to 3 in which both lines are white outputs 2.0V. However, the PT 9 corresponding to the digit number 4 in which one line is white and the other line is blue may output 1.75V, that is in the middle of 2.0V and 1.5V, and each of the PTs 9 corresponding to the digit numbers 5 and 6 in which one line is white and the other line is black may output 1.5V, that is in the middle of 2.0V and 1.0V, for example. As a voltage value output from each of the PTs 9 is the analog data, an intermediate value of colors of adjacent upper and lower patterns is output from the PT 9 when each PT 9 is located at the boundary of two lines in the color pattern 11 and reads the color patterns of the two lines.

When the region 22 is read, the voltage values of "2.0V, 2.0V, 2.0V, 1.75V, 1.5V, 1.5V" corresponding to the digit numbers 1 to 6 are output from the PTs 9 in the described example. Since each of the output voltage values of the digit numbers 5 and 6 corresponds to a voltage value when the blue color pattern is read, the microcomputer 3 recognizes that the color pattern corresponding to the value "1" has been read for the digit numbers 5 and 6. On the other hand, since the output voltage value of the digit number 4 is just the middle of voltages 2.0V corresponding to the white color pattern and 1.5V corresponding to the blue color pattern, the microcomputer 3 cannot determine whether either value "0" or "1" has been read.

Therefore, the microcomputer 3 may convert the read pattern of the region 22 into either the ternary value "000011" or "000111" based on the voltage value from each PT9, and converts the ternary value into a decimal value to calculate the length of the measurement object. However, the ternary value "000011" or "000111" is not identical with both of the values "000022" and "000100" located in the region 22. Moreover, the decimal value "4" or "13" corresponding to the ternary value "000011" or "000111"is not the same as the decimal value "8" or "9" corresponding to two lines of region 22. For this reason, the measured length calculated by the microcomputer 3 is not identical with the actual length of the measurement object, and an error occurs in the reading. Thus, when the color pattern 11 of FIG. 2 is adopted, a reading error may occur at the boundary of the color pattern 11.

Figures 3A, 3B:
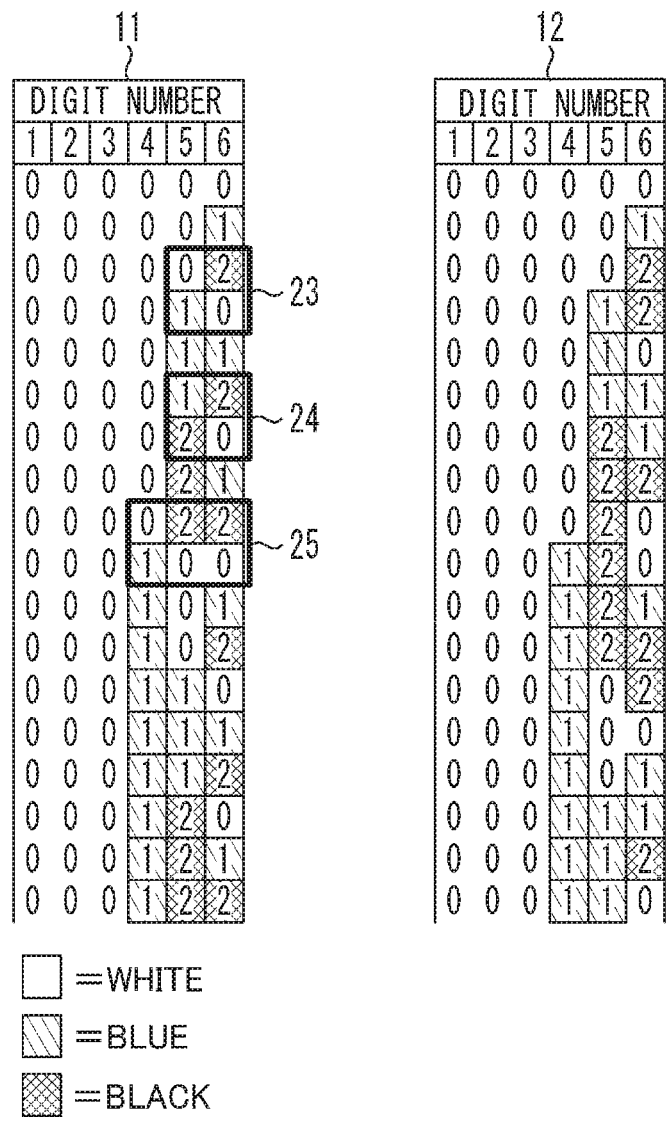
FIG. 3A is a diagram illustrating an example of the color pattern of the ternary number.
FIG. 3B is a diagram illustrating an example of a color pattern by a ternary Gray code.

FIG. 3A is a diagram illustrating an example of the color pattern of the ternary number explained in FIG. 2. FIG. 3B is a diagram illustrating an example of another color pattern 12 by a ternary Gray code.

Since the intermediate value of the upper and lower patterns is obtained if the boundary of the adjacent color patterns is read as described above, when the color pattern 11 as illustrated in FIG. 3A is used, there is a case where an error occurs between the actual length of the measurement object and the measured length calculated by the microcomputer 3.

One of the reasons for such error occurrence is that the color change, in which a change of the colors between the adjacent upper and lower color patterns, occurs in a plurality of digits, as indicated in the regions 23 to 25 of FIG. 3A. For example, in the regions 23 and 24, the color change occurs in two digits, the digit numbers 5 and 6. In the region 25, the color change occurs in three digits, the digit numbers 4 to 6.

To solve the error occurrence of the measurement value, it is conceivable to adopt the color pattern 12 by the ternary Gray code as illustrated in FIG. 3B. In the color pattern 12 by the ternary Gray code, the color change in the adjacent upper and lower color patterns occurs in only one digit.

FIG. 4 is a diagram illustrating a reading processing of the color pattern 12 by the ternary Gray code.

When a region 27 of the color pattern 12 is read, each of the PTs 9 corresponding to white digit numbers 1 to 3 outputs 2.0V, each of the PTs 9 corresponding to blue digit numbers 4 and 6 outputs 1.5V, and the PT 9 corresponding to black digit number 5 outputs 1.0V. The microcomputer 3 determines the color of each digit based on the voltage value from each PT 9, and converts the read color into the corresponding ternary valueGray. From a pattern of the region 27 of FIG. 4, a ternary value Gray"000121" is obtained. The microcomputer 3 converts the ternary value Gray"000121" into a decimal value to calculate the length of the measurement object. Here, well-known methods are used as a method of converting Graythe ternary number into the decimal number. In the region 27, the ternary valueGray "000121" is converted into a decimal number "10", by referring to a table showing a relationship between the ternary number and the decimal number, for instance. Since the region 27 corresponds to the decimal number "10", the length of the measurement object is identical with the length indicated by the measure 7a.

On the other hand, when a region 28 of the color pattern 12 is read, each of the PTs 9 corresponding to the digit numbers 1 to 4 in which upper and lower patterns are white outputs 2.0V, and the PT 9 corresponding to the digit number 5 in which the upper and lower patterns are blue outputs 1.5V. On the contrary, the PT 9 corresponding to the digit number 6 in which one line is black and the other line is white may output 1.5V. The microcomputer 3 may determine that the ternary Gray code corresponding to the region 28 is "000011" based on the output voltage value from the PTs 9. The microcomputer 3 converts the ternary value "000011" into a decimal value "5" to calculate the length of the measurement object. Although an error is smaller than the error of the example of FIG. 2, the color patterns "000012" and "000010" located in the region 28 correspond to decimal values "3" and "4", and therefore they are not identical with the decimal number "5" calculated by the microcomputer 3.

The reason why the error occurs even when the color pattern 12 by the ternary Graycode illustrated in FIG. 4 is used is that a binary change occurs in the digits of the upper and lower patterns adjacent to the boundary of the color pattern 12. The binary change means that a difference between values of the same digit of the upper and lower patterns is 2 or more, i.e., means that there is a change of white and black in the color pattern 12 of FIG. 4.

In the digit number 6 of the region 28, the upper pattern adjacent to the boundary is black (2), and the lower pattern adjacent to the boundary is white (0). In this case, the PT 9 corresponding to the digit number 6 may output 1.5V, which is the same as an output voltage value of the PT 9 when the blue pattern is read, and therefore the microcomputer 3 determines the color of the digit number 6 as the blue. For this reason, an error may occur between the length of an actual measurement object and the measured length calculated by the microcomputer 3.

When the value change between the upper and lower patterns adjacent to the boundary of the color pattern 12 is a single value change, such an error does not occur. The single value change means that the difference between values of the same digit of the upper and lower patterns is 1, or that there is a change of white and blue or a change of blue and black in the color pattern 12 of FIG. 4.

Figure 5:
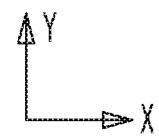
FIG. 5 is a diagram illustrating an example of a color pattern of a code that has improved the ternary Gray code using three colors.

FIG. 5 is a diagram illustrating another example of a color pattern 13 by the ternary Gray code using three colors. The color pattern 13 of FIG. 5 is capable of improving a problem caused by the color pattern 12. It is assumed that a lateral direction (i.e., a digit direction) of FIG. 5 is an X direction, and a vertical direction of FIG. 5 in which patterns of the same digit are arranged is a Y direction.

In the color pattern 13, the color change or value change between the adjacent upper and lower patterns occurs in only one digit, and the value change is the single value change. Therefore, the ternary Gray code of the color pattern 13 does not cause the binary change. That is to say, in the color pattern 13, a plurality of patterns assigned to respective different decimal values are arranged, each pattern has a plurality of digits to which values of N-ary number are assigned (N is 3 or more), and each digit has a different color depending on the assigned value. In the example of the color pattern 13, a plurality of patterns are arranged in an ascending or descending order, a humming distance between adjacent patterns in the arrangement direction is 1, an amount of change in the value at one of the digits included in the adjacent patterns is 1, and an amount of change in the value at the other digits of the adjacent color patterns is 0.

Even when the boundary of the adjacent upper and lower patterns is read and an intermediate value between the voltage values of the upper and lower patterns is output from the PTs 9, the microcomputer 3 can convert the intermediate value into the decimal value corresponding to either one of the upper pattern or the lower pattern by using the color pattern 13. For this reason, a substantial error does not occur between the length of the actual measurement object and the measured length calculated by the microcomputer 3.

Note that the ternary color patterns illustrated in FIG. 4 and FIG. 5 are not arranged in an ascending or descending ternary order. Further, the decimal values are not mathematically assigned to each of the ternary color patterns. For instance, the ternary value "000121" in the region 27 of FIG. 4 shall mathematically mean the decimal value "16", but is actually assigned to the decimal value "10". In FIGS. 4 and 5, decimal values are just assigned to each of the ternary color patterns in the order in which the color patterns are aligned.

Figure 6:
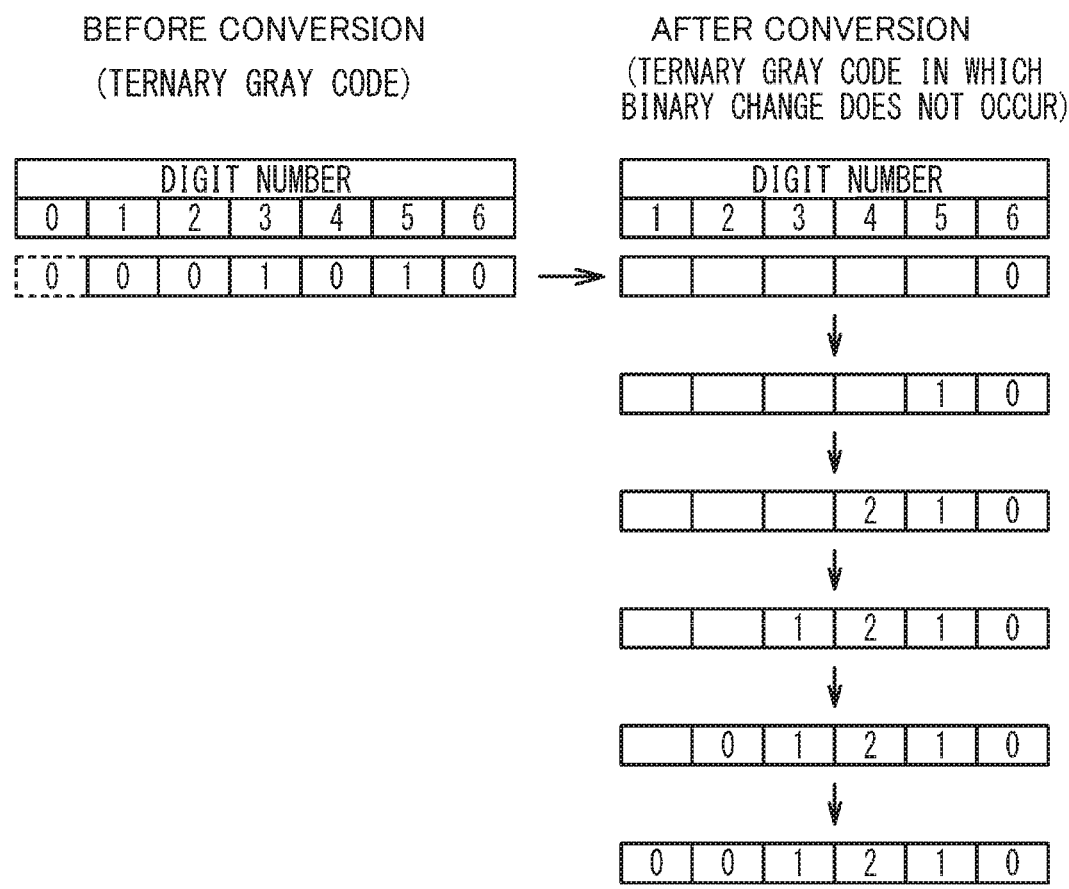
FIG. 6 is a diagram illustrating a method of creating a new ternary Gray code in which binary change does not occur from the ternary Gray code.

FIG. 6 is a diagram illustrating a method of creating a new ternary Gray code in which the binary change does not occur from the ternary Gray code.

A conversion rule to create the new binary Gray code in which the binary change does not occur from the binary Gray code is as follows:

(1) When the total of the values of the digits upper than a digit to be converted is 0 or even, the value of the digit to be converted is maintained;

(2) When the total of the values of the digits upper than the digit to be converted is odd, and the value of the digit to be converted is 1, the value of the digit to be converted is maintained;

(3) When the total of the values of the digits upper than the digit to be converted is odd, and the value of the digit to be converted is 2, the value of the digit to be converted is converted into 0; and (4) When the total of the values of the digits upper than the digit to be converted is odd, and the value of the digit to be converted is 0, the value of the digit to be converted is converted into 2.

Here, it is assumed that the digit number 1 is the most significant digit and the digit number 6 is the least significant digit. Moreover, although a digit of the digit number 0 is illustrated in the ternary Gray code of FIG. 6 before conversion, this digit number 0 is an imaginary digit that is set for a value conversion processing of the digit number 1 for convenience and does not exist in the color pattern 13. Further, a value "0" as a fixed value is virtually set to a digit of the digit number 0.

As an example, a description will be given of a method of creating a new ternary Gray code in which the binary change does not occur from the ternary Gray code "001010" illustrated in FIG. 6.

First, a value "0" of the digit number 6 before conversion is converted. Since the total of the values of the digit numbers 0 to 5 upper than the digit number 6 is 2 (even), the value of the digit number 6 is maintained to "0" according to the conversion rule (1). Next, the total of the values of the digit numbers 0 to 4 upper than the digit number 5 is 1 (odd), and the value of the digit number 5 is 1. Therefore, the value of the digit number 5 is maintained to "1" according to the conversion rule (2).

In the digit number 4, the total of the values of the digit numbers 0 to 3 upper than the digit number 4 before conversion is 1 (odd), and the value of the digit number 4 is 0. Therefore, the value of the digit number 4 is converted from "0" to "2" according to the conversion rule (4). In the digit number 3, the total of the values of the digit numbers 0 to 2 upper than the digit number 3 before conversion is 0, and therefore the value of the digit number 3 is maintained to "1" according to the conversion rule (1).

In the digit number 2, the total of the values of the digit numbers 0 and 1 upper than the digit number 2 before conversion is 0, and therefore the value of the digit number 2 is maintained to "0" according to the conversion rule (1). Finally, since the value of the digit number 0 upper than the digit number 1 before the conversion is 0, the value of the digit number 1 is maintained to "0" according to the conversion rule (1).

By such a procedure, the ternary Gray code "001010" is converted into the new ternary Gray code "001210" in which the binary change does not occur.

It is also possible to inversely convert from the new ternary Gray code in which the binary change does not occur into the original ternary Gray code in accordance with the conversion rules (1) to (4).

Thus, by determining the conversion rules corresponding to the N-ary Gray code, it is possible to create a new N-ary Gray code in which the binary change does not occur from the N-ary Gray code. When software equipped with an algorithm for executing the method of FIG. 6 is operated on a computer, the new ternary Gray code can be created.

Figure 7:
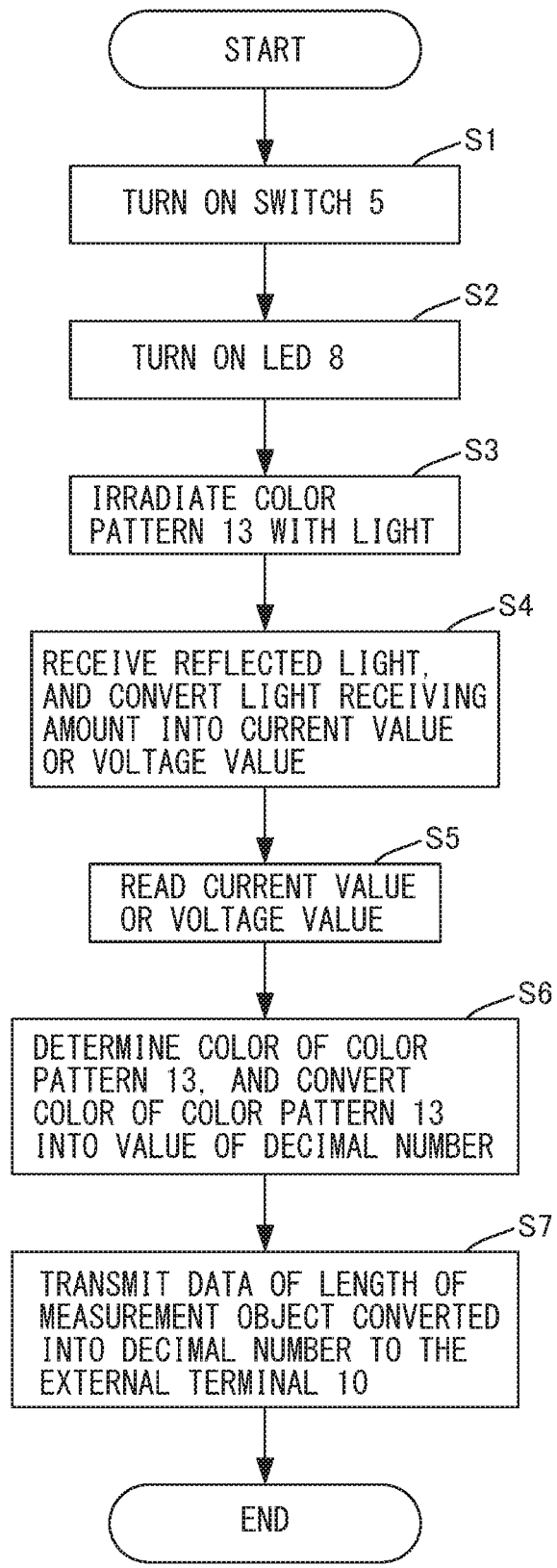
FIG. 7 is a flowchart illustrating a processing operation of the measuring instrument.

FIG. 7 is a flowchart illustrating a processing operation of the measuring instrument 1.

First, when the switch 5 is depressed to measure a length of a measuring object, the start of the measurement is instructed to the microcomputer 3 (S1). The microcomputer 3 turns on each LED 8 (S2), and the LED 8 irradiates the color pattern 13 with light (S3). Each PT 9 receives reflected light from the color pattern 13, and outputs a current or voltage corresponding to the light receiving amount (S4). The microcomputer 3 reads a current value or voltage value output from each PT 9 (S5).

The microcomputer 3 determines a read color of each digit of the color pattern 13 based on the current value or voltage value outputted from each PT 9, calculates an N-ary value of each digit of the N-ary Gray code from the read color of the color pattern 13 Gray, and converts the N-ary value into a decimal value (S6). When calculating the decimal value assigned to the color pattern 13 from the ternary value, the ternary value obtained by reading the N-ary Gray code is inversely converted with the conversion rules as described in connection with FIG. 6, and then the inversely converted ternary value is converted into a decimal value based on a well-known conversion method. The microcomputer 3 may be provided beforehand with a table indicating a corresponding relationship between the colors of each line of the color pattern 13 and the decimal value, and may determine the decimal value corresponds to the read ternary number by referring to this table. The table may contain any other information that can be used to convert the read ternary values into decimal values. Then, the microcomputer 3 transmits data converted into the decimal number to the external terminal 10 via the communication device 4 (S7), and terminates the present processing. The external terminal, or other device that is communicatable with the external terminal, converts the received decimal number into actual measured length.

Since the color pattern is N-ary numbers (N is 3 or more), it is possible to reduce the number of digits constituting the color pattern and thin the width of the measure 7a, as compared with the case where the binary code is printed on the measure. Also, it is possible to reduce the number of reading sensors, i.e., the number of LEDs 8 and PTs 9, for reading the color pattern. Therefore, it is possible to reduce the size of the reader unit and the measuring instrument.

When the color pattern 13 as shown in FIG. 5 is used, a measurement accuracy of the length of the measurement object, in other words a minimum measurable length, depends on a width of each color pattern in the Y direction. To increase the measurement accuracy, in other word to shorten the minimum measurable length, it is conceivable to narrow the width of the color pattern in the Y direction. However, to measure the same length with such measure, the number of digits in each line of the color pattern 13 needs to be increased. In order to increase the number of digits without changing the width of the measure 7a, the width of each digit of the color pattern in the X direction is required to be narrowed, and therefore the widths in the X direction and the Y direction of one color pattern need to be reduced. On the other hand, a photo sensor of the PT 9 has a constant detection range, and a photo sensor having a narrow detection range capable of reading narrower color patters is expensive. Sometimes it is difficult to narrow an interval in the X direction between the adjacent photo sensors, and it may be difficult to read narrower color patterns. As described above, it is difficult to increase the number of digits in the color pattern.

Hereinafter, a description will be given of an embodiment to improve the accuracy of the measurement without increasing the number of digits of the color pattern 13.

First Embodiment

Figure 8:
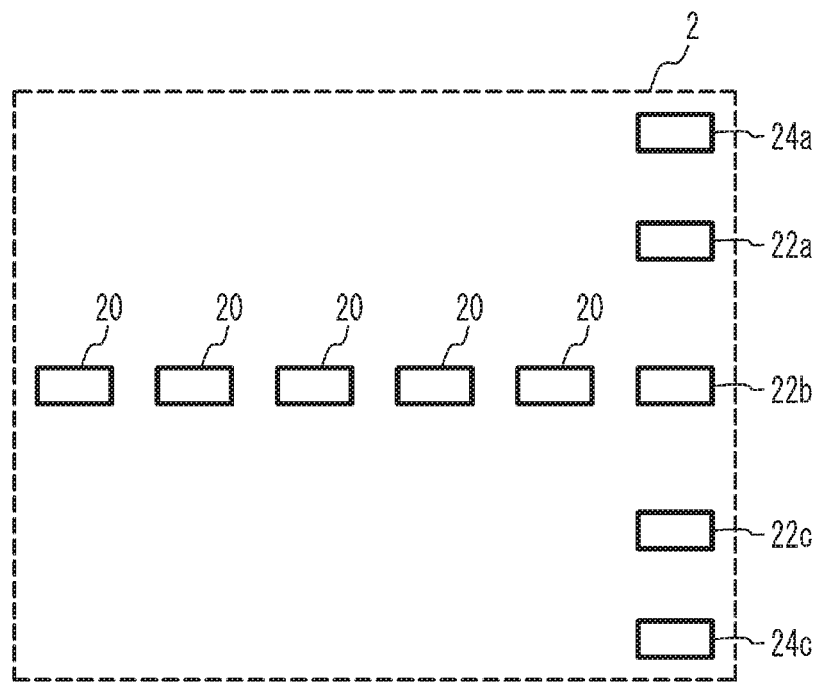
FIG. 8 is a diagram illustrating a reader unit of the measuring instrument according to a first embodiment.

FIG. 8 is a diagram illustrating the reader unit of the measuring instrument 1 according to a first embodiment. The reader unit 2 includes five readers (first readers) 20 arranged in X direction, three readers (second readers) 22a to 22c arranged in Y direction, and two readers (third readers) 24a and 24c arranged in Y direction. Each of the readers 20, 22a to 22c, 24a and 24c includes the LED 8 and the PT 9.

Figure 9A:
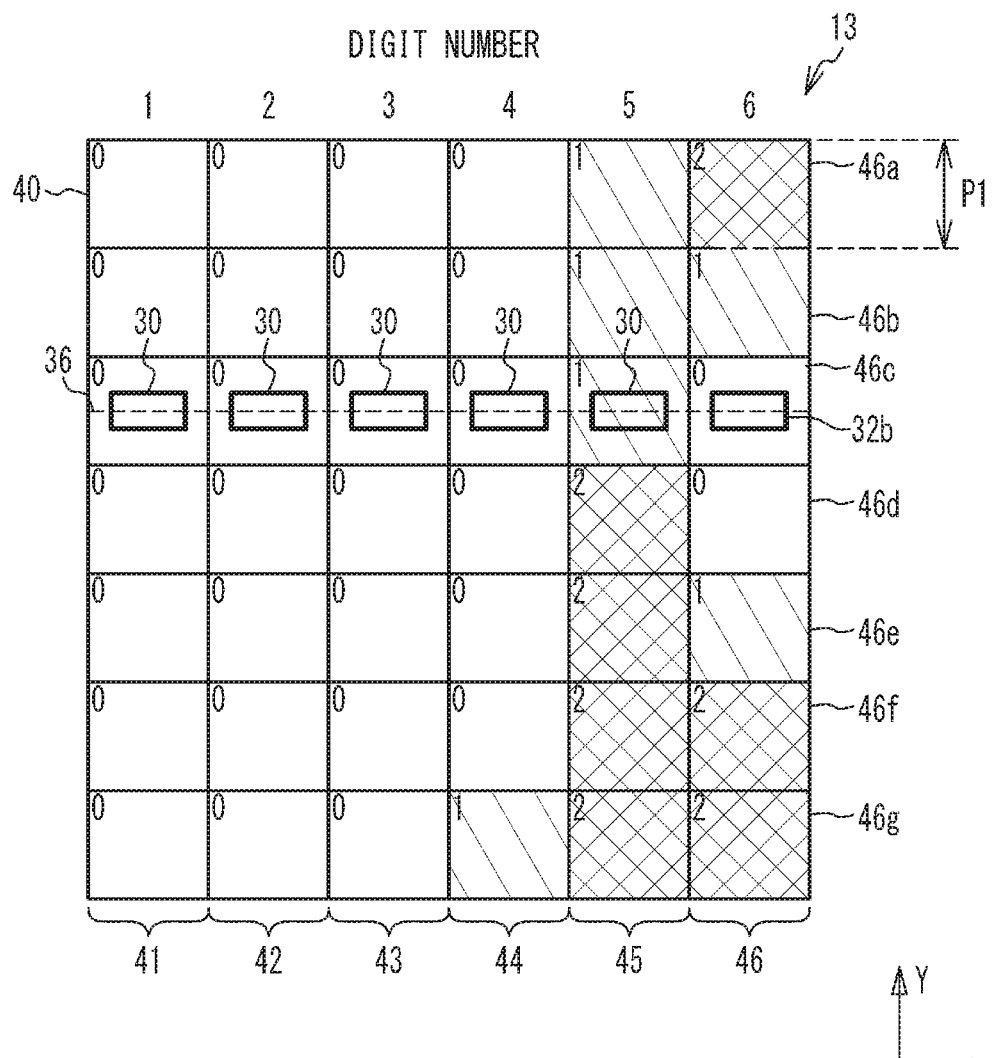
FIG. 9A is an enlarged view of the color pattern according to the first embodiment.
Figure 9B:
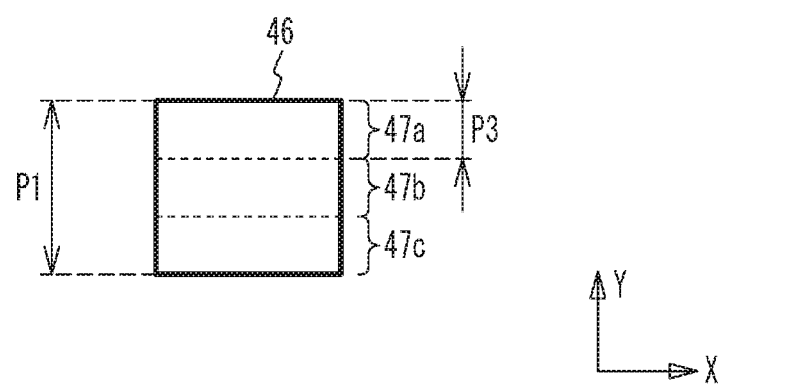
FIG. 9B is an enlarged view of a single pattern.

FIG. 9A is an enlarged view of the color pattern according to the first embodiment. FIG. 9B is an enlarged view of a single pattern. FIG. 9A illustrates an enlarged range A in FIG. 5, and illustrates the ternary value in an upper left of each pattern 40. The ternary value does not have to be shown in the measure 7a. The values "0", "1" and "2" correspond to white, blue and black, respectively.

In the color pattern 13, a plurality of patterns 40 are arranged in the X direction and the Y direction, as illustrated in FIG. 9A. The patterns 40 of the digit numbers 1 to 6 are denoted as patterns 41 to 46, respectively The patterns 46 of the least significant digit are denoted as the patterns 46a to 46g from the upside along the Y direction. The width in the Y direction of each pattern 40 is P1, for example 3 mm. The widths P1 of all patterns 40 are substantially the same as each other, and fall within an error range of about a manufacturing error. Each of the six patterns 41 to 46 arranged in the X direction corresponds to a single line of a color pattern. Five ranges 30 and a range 32b correspond to ranges in which each of the readers 20 and the reader 22b read the patterns 40, respectively. The ranges 30 and 32b are arranged in, and are located on a line extending in the X direction. A position of the line on which the ranges 30 and 32b are arranged is referred to as a measurement position 36. In FIG. 9A, the measurement position 36 is located in the center of the pattern 40 in the Y direction, and is a reference position of the color pattern reading. In the example of FIG. 9A, the accuracy of the length measurement which corresponds to a minimum measurable length is P1, that is 3 mm. Hereinafter, a description will be given of a method of setting the accuracy of the length measurement to 1 mm, i.e., one third of the width P1 by using the same color pattern as FIG. 9A.

The pattern 46 of the least significant digit is virtually divided into three regions 47a to 47c along the Y direction for the purpose of a description. The regions 47a to 47c cannot be visibly distinguished from each other on the measure 7a. A width in the Y direction of each of the regions 47a to 47c is P3. The P3 is one third of the P1, for example 1 mm. The widths P3 of the regions 47a to 47c are substantially the same as each other.

Figure 10:
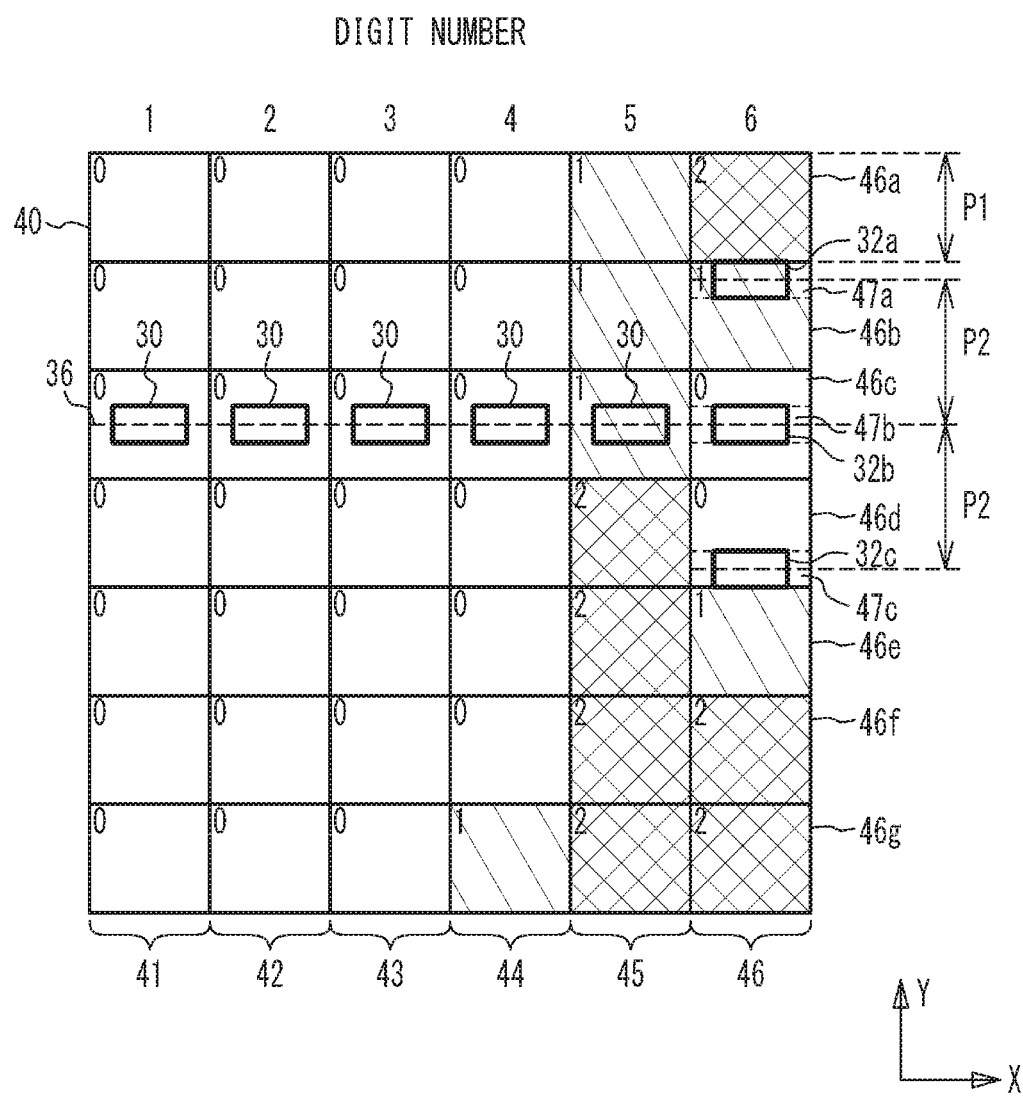
FIG. 10 is an enlarged view of the color pattern according to the first embodiment.
Figure 11:
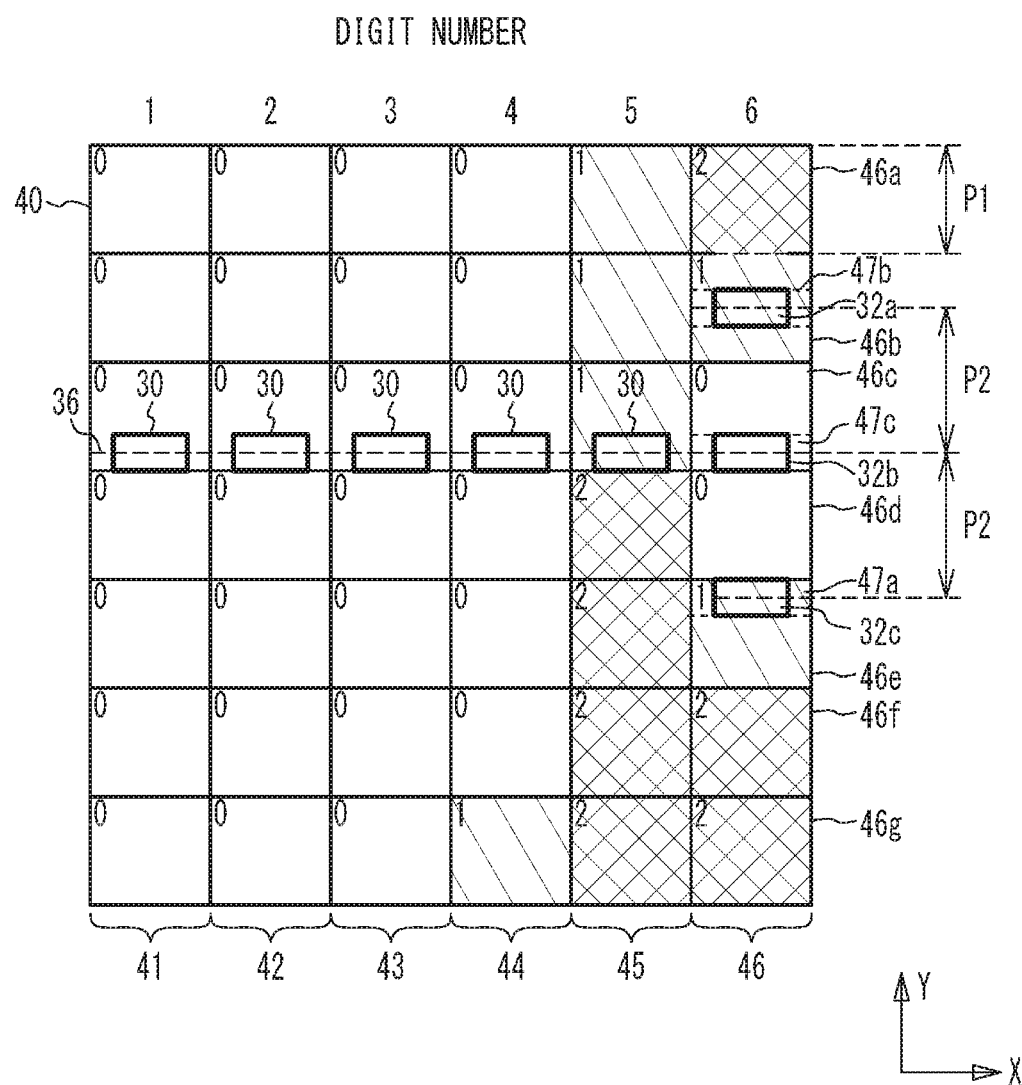
FIG. 11 is an enlarged view of the color pattern according to the first embodiment.
Figure 12:
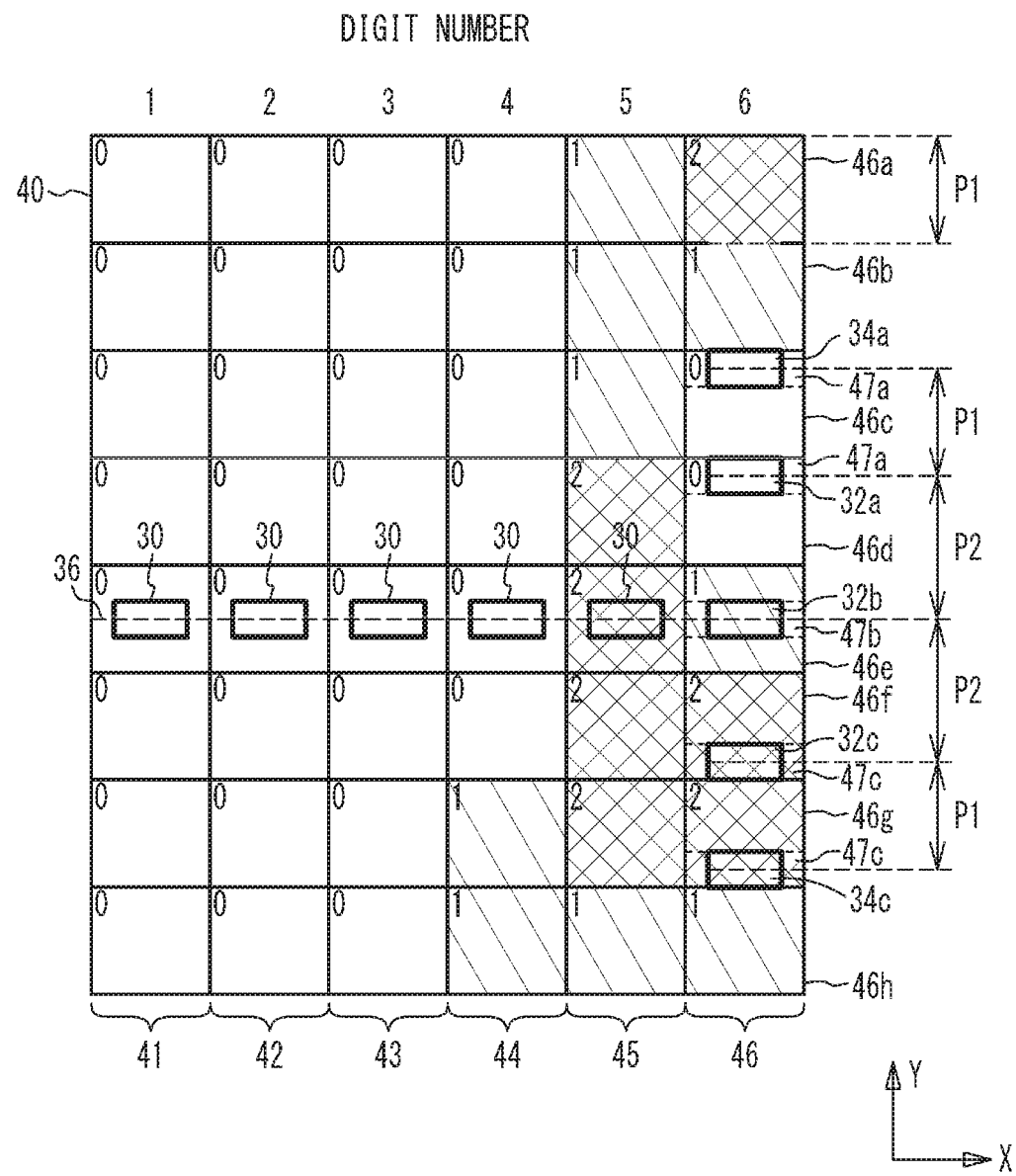
FIG. 12 is an enlarged view of the color pattern according to the first embodiment.

FIGS. 10 to 12 are enlarged views of the color pattern and a reading state according to the first embodiment. In the example of FIG. 10, the range 32b to be read by the reader 22b is located in the region 47b of the pattern 46c, the range 32a to be read by the reader 22a is located in the region 47a of the pattern 46b, and the range 32c to be read by the reader 22c is located in the region 47c of the pattern 46d. A distance between the centers of the ranges 32a and 32b, a distance between the readers 22a and 22b is P2, and a distance between the centers of the ranges 32b and 32c, i.e., a distance between the readers 22b and 22c is P2. The distance P2 is a sum of the width P1 and the width P3, for example 4 mm.

In FIG. 10, the colors to be read in the ranges 32a, 32b and 32c are blue (1), white (0) and white (0), respectively. In this case, the microcomputer 3 determines that the measurement position 36 is located in the center of the pattern 46c in the Y direction which is the center of the region 47b in the pattern 46c.

On the other hand, in the example of FIG. 11, the range 32b is located in the region 47c of the pattern 46c, the range 32a is located in the region 47b of the pattern 46b, and the range 32c is located in the region 47a of the pattern 46e. In FIG. 11, the positions of all readers are shifted by the width P3 in a −Y direction from their positions of FIG. 10, and the colors to be read in the ranges 32a, 32b and 32c are blue (1), white (0) and blue (1), respectively. In this case, the microcomputer 3 determines that the measurement position 36 is located away from the center of the pattern 46c in the Y direction by a distance +P3.

Similarly, although the illustration is omitted, when the range 32b is located in the region 47a of the pattern 46c, the range 32a is located in the region 47c of the pattern 46a, and the range 32c is located in the region 47b of the pattern 46d. In this state, the positions of all readers are shifted by the width P3 in a +Y direction from their positions of FIG. 10. The colors to be read in the ranges 32a, 32b and 32c of the digit number 6 are black (2), white (0) and blue (1), respectively. In this case, the microcomputer 3 determines that the measurement position 36 is located away from the center of the pattern 46c in the Y direction by a distance –P3.

In a state of FIG. 10, in a state of FIG. 11, and in a state where the range 32b is located in the region 47a of the pattern 46c, the reader 22b which is disposed in the measurement position 36 reads white of the pattern 46c. On the other hand, in the above-mentioned three states, the reader 22a reads blue, blue and black, respectively, and the reader 22c reads white, blue and white, respectively. Therefore, it is possible to determine a positional relationship between the color pattern and the readers 22a, 22b and 22c from the combination of the colors which the three readers 22a, 22b and 22c read. In the above-mentioned three states, each reader is shifted in the Y direction by the distance ±P3. Therefore, by determining the above-mentioned three states, it is possible to set the measurement accuracy of the length to the width P3, i.e., 1 mm. In this way, a change in the colors read by the readers 22a and 22c is detected by using the readers 22a and 22c disposed away from the reader 22b in the Y direction by the distance P2, which makes it possible to set the measurement accuracy of the length that corresponds to a minimum measurable length to the width P3 which is one third of the width P1.

In the color pattern of FIG. 5, there is a case where the color of the pattern 46 of the least significant digit is continuous twice in the Y direction, and therefore, when using three readers 22a to 22c, there may be a case where it cannot be determined that the range 32b is located in which of the region 47a, 47b or 47c. Hereinafter, a description will be given of how to solve this problem with referring to FIG. 12.

For example, when the measurement position 36 is located in the region 47b of the pattern 46e as illustrated in FIG. 12, the patterns 46d, 46e and 46f are read in the ranges 32a, 32b and 32c, and the read colors are white (0), blue (1) and black (2), respectively. On the other hand, when the measurement position 36 is located in the region 47a of the pattern 46e, the patterns 46c, 46e and 46f are read in the ranges 32a, 32b and 32c, and the read colors are white (0), blue (1) and black (2), respectively. Also, when the measurement position 36 is located in the region 47c of the pattern 46e, the patterns 46d, 46e and 46g are read in the ranges 32a, 32b and 32c, and the read colors are white (0), blue (1) and black (2), respectively. Thus, in a state such as FIG. 12 in which the pattern 46c and the pattern 46d are the same color and the pattern 46f and the pattern 46g are the same color in particular, the colors read from the respective readers 22a to 22c is all the same combination even if the measurement position 36 is located in which of the region 47a, 47b or 47c. Therefore, it is not possible to determine that the measurement position 36 is located in which of the regions 47a, 47b and 47c, based on only the colors read from the three readers 22a to 22c. Accordingly, the measurement accuracy is not necessarily the width P3.

Therefore, the color pattern further is read by using the two additional readers 24a and 24c, as illustrated in FIG. 12. In FIG. 12, the range 34a corresponding to the reader 24a is set at a position away from the range 32a corresponding to the reader 22a in the +Y direction by the width P1. The range 34c corresponding to the reader 24c is set at a position away from the range 32c corresponding to the reader 22c in the –Y direction by the width P1. When the range 32b is located in the region 47b of the pattern 46e as illustrated in FIG. 12, the range 32a is located in the region 47a of the pattern 46d, the range 34a is located in the region 47a of the pattern 46c, the range 32c is located in the region 47c of the pattern 46f, and the range 34c is located in the region 47c of the pattern 46g. In this case, the patterns 46c, 46d, 46e, 46f and 46g are read in the ranges 34a, 32a, 32b, 32c and 34b, and the read colors are white (0), white (0), blue (1), black (2) and black (2), respectively.

On the other hand, when the measurement position 36 is located in the region 47a of the pattern 46e, the patterns 46b, 46c, 46e, 46f and 46g are read in the ranges 34a, 32a, 32b, 32c and 34c, and the read colors are blue (1), white (0), blue (1), black (2) and black (2), respectively. When the measurement position 36 is located in the region 47c of the pattern 46e, the patterns 46c, 46d, 46e, 46g and 46h are read in the ranges 34a, 32a, 32b, 32c and 34c, and the read colors are white (0), white (0), blue (1), black (2) and blue (1), respectively. Thus, it is possible to determine that the measurement position 36 is located in which of the regions 47a to 47c by using the readers 24a and 24c disposed at positions shifted from the readers 22a and 22c by the width P1 in the Y direction. Therefore, even when the two patterns 46 with the same color are continuously arranged on the least significant digit in the Y direction, the measurement accuracy of the width P3 can be achieved, Here, in the color pattern of FIG. 5, three patterns 46 on the least significant digit with the same color are not continuously arranged in the Y direction, and it is therefore sufficient that the readers illustrated in FIG. 12 are used.

FIG. 13 is a diagram illustrating a table used in the first embodiment. A color of the range 32b (i.e., the ternary value), a sum of the values of the ranges 30, a combination of the colors of the ranges 34a, 32a, 32c and 34c, and a correction value to be added to the length calculated from the reading result are set in the table as illustrated in FIG. 13. The sum of the values of the ranges 30 indicates whether the sum of the patterns 41 to 45 other than the pattern 46 of the least significant digit is odd or even. The correction value is a value to be add to the length determined by the colors read in the ranges 30 and 32b. The correction value "–P3" indicates reducing a length corresponding to the width P3 (e.g. 1 mm) from the length determined by the reading result of the ranges 30 and 32b. The correction value "+P3" indicates adding the length corresponding to the width P3 (e.g. 1 mm) to the length determined by the reading result of the ranges 30 and 32b.

As described above, the microcomputer 3 determines the length of the measurement object by using the measurement results of the readers 20, 22a to 22c, 24a and 24c. Therefore, it is possible to improve the measurement accuracy of the length compared with the width P1 of the pattern, without increasing the number of digits of the color pattern 13.

First Variation of First Embodiment

Figure 14:
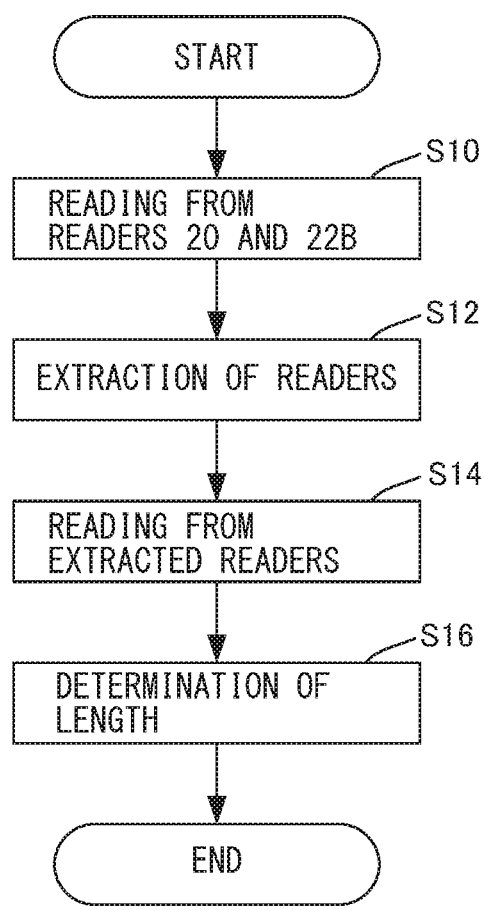
FIG. 14 is a flowchart illustrating a processing executed by a microcomputer according to a first variation of the first embodiment.

FIG. 14 is a flowchart illustrating a processing executed by the microcomputer according to a first variation of the first embodiment. The microcomputer 3 determines the colors of the patterns from the output of the readers 20 and 22b (S10). For example, the microcomputer 3 executes the operation of S2 to S5 in FIG. 7 to the readers 20 and 22b. In this case, the microcomputer 3 may control the readers 24a, 22a, 22c and 24c so as not to read the color pattern by turning off the readers 24a, 22a, 22c and 24c or supplying no power supply to the LEDs 8 and the PTs 9 of the readers 24a, 22a, 22c and 24c.

Next, the microcomputer 3 extracts readers for reading the pattern from the reader 24a, 22a, 22c and 24c, based on the reading result of the readers 20 and 22b (S12). A method of determining the readers to be extracted will be described later. The microcomputer 3 determines the colors of the patterns read by the extracted readers, based on the output from the extracted reader (S14). For example, the microcomputer 3 executes the operation of S2 to S5 in FIG. 7 to the extracted readers, and turns off unextracted readers.

Next, the microcomputer 3 determines the length of the measurement object based on the determined colors of the read patterns (S16). For example, the microcomputer 3 executes the operation of S6 and S7 in FIG. 7. Then, the present processing is terminated.

FIG. 15 is a diagram illustrating a table used in the first variation of the first embodiment. When the microcomputer 3 determines the color of the range 32b and determines whether the sum of the values of the ranges 30 is odd or even, the microcomputer 3 can determine ranges among the ranges 34a, 32a, 32c and 34c required for determining the correction value. A reading result in a range enclosed in each of solid lines 50 of FIG. 15 is used for the determination of the length. On the other hand, a reading result in a range enclosed in each of dotted lines 52 is not used for the determination of the length. Moreover, either one of two ranges enclosed in each of dotted lines 54 is used for the determination of the length.

When the color of the range 32b is black (2) and the sum of the values of the ranges 30 is odd as illustrated in the first line of FIG. 15, the color read in any one of the ranges 34a or 32a, and the color read in the range 32c are used for the determination of the correction value, but the color read in the range 34c is not used. Therefore, in S12 of FIG. 14, the microcomputer 3 extracts the reader 22c and one of the readers 24a or 22a, and does not extract the reader 24c and the other of the readers 24a or 22a.

When the color of the range 32b is blue (1) and the sum of the values of the ranges 30 is even as illustrated in the fifth line of FIG. 15, the color read in ranges 34a and 34c are used for the determination of the correction value, but the color read in the ranges 32a and 3cc are not used. Therefore, in S12 of FIG. 14, the microcomputer 3 extracts the readers 24a and 24c, and does not extract the readers 22a and 22c.

In the first variation, two readers among the four readers 24a, 22a, 22c and 24c are used and the remaining two readers are not used, and it is therefore possible to suppress the consumption of an electric power.

Second Variation of First Embodiment

Figure 16A:
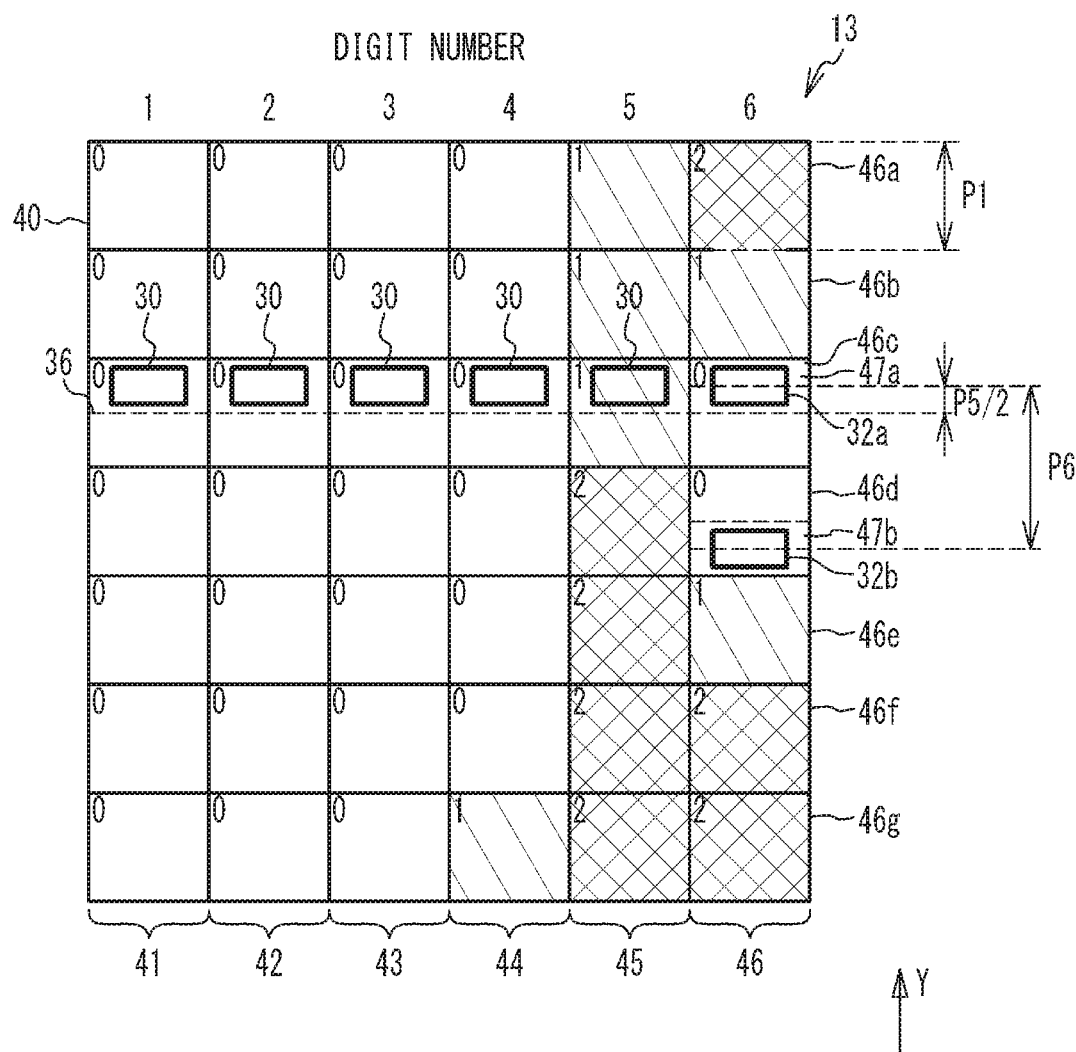
FIG. 16A is an enlarged view of a color pattern according to a second variation of the first embodiment.
Figure 16B:
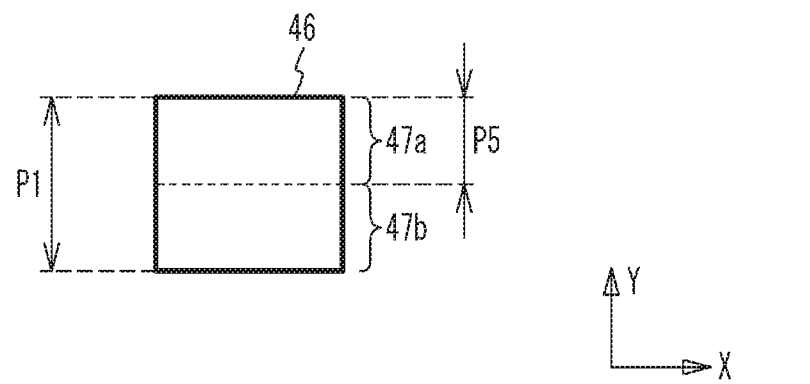
FIG. 16B is an enlarged view of the pattern.

A second variation of the first embodiment indicates an example in which the accuracy of the length is a half of the width P1. FIG. 16A is an enlarged view of a color pattern according to the second variation of the first embodiment. FIG. 16B is an enlarged view of the single pattern. As illustrated in FIG. 16A, two ranges 32a and 32b read by the readers 22a and 22b respectively are provided on the patterns 46 of the least significant digit. In the second variation, the plurality of readers 20 and the reader 22a are arranged in a row in the X direction.

The pattern 46 of the least significant digit is virtually divided into two regions 47a and 47b in the Y direction, as illustrated in FIG. 16B. The width in the Y direction of each of the regions 47a and 47b is P5. The width P5 is a half of the width P1. For example, the widths P1 and P5 are 4 mm and 2 mm, respectively.

In the example of FIG. 16A, the range 32a is located in the region 47a of the pattern 46c, and the range 32b is located in the region 47b of the pattern 46d. A distance in the Y direction between the center of the ranges 30 and 32b, and the measurement position 36 as a reading reference is P5/2, for example 1 mm. A distance P6 in the Y direction between the centers of the ranges 32a and 32b is a sum of the widths P1 and P5, for example 6 mm. In the example of 16A, the microcomputer 3 determines that the measurement position 36 is located in the center of the pattern 46c in the Y direction, from a relationship of the color read in the range 32a and the color read in the range 32b.

Figure 17:
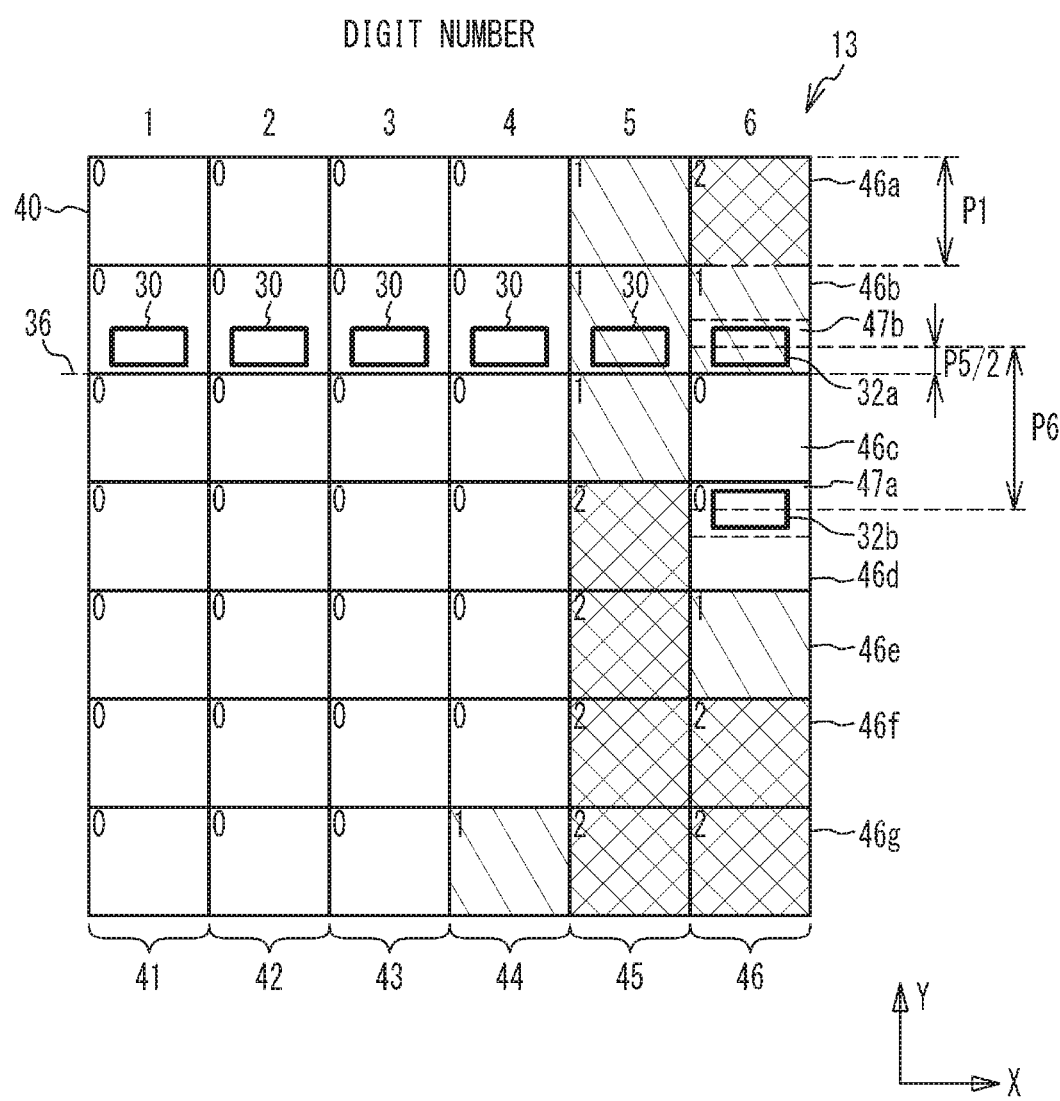
FIG. 17 is an enlarged view of the color pattern according to the second variation of the first embodiment.
Figure 18:
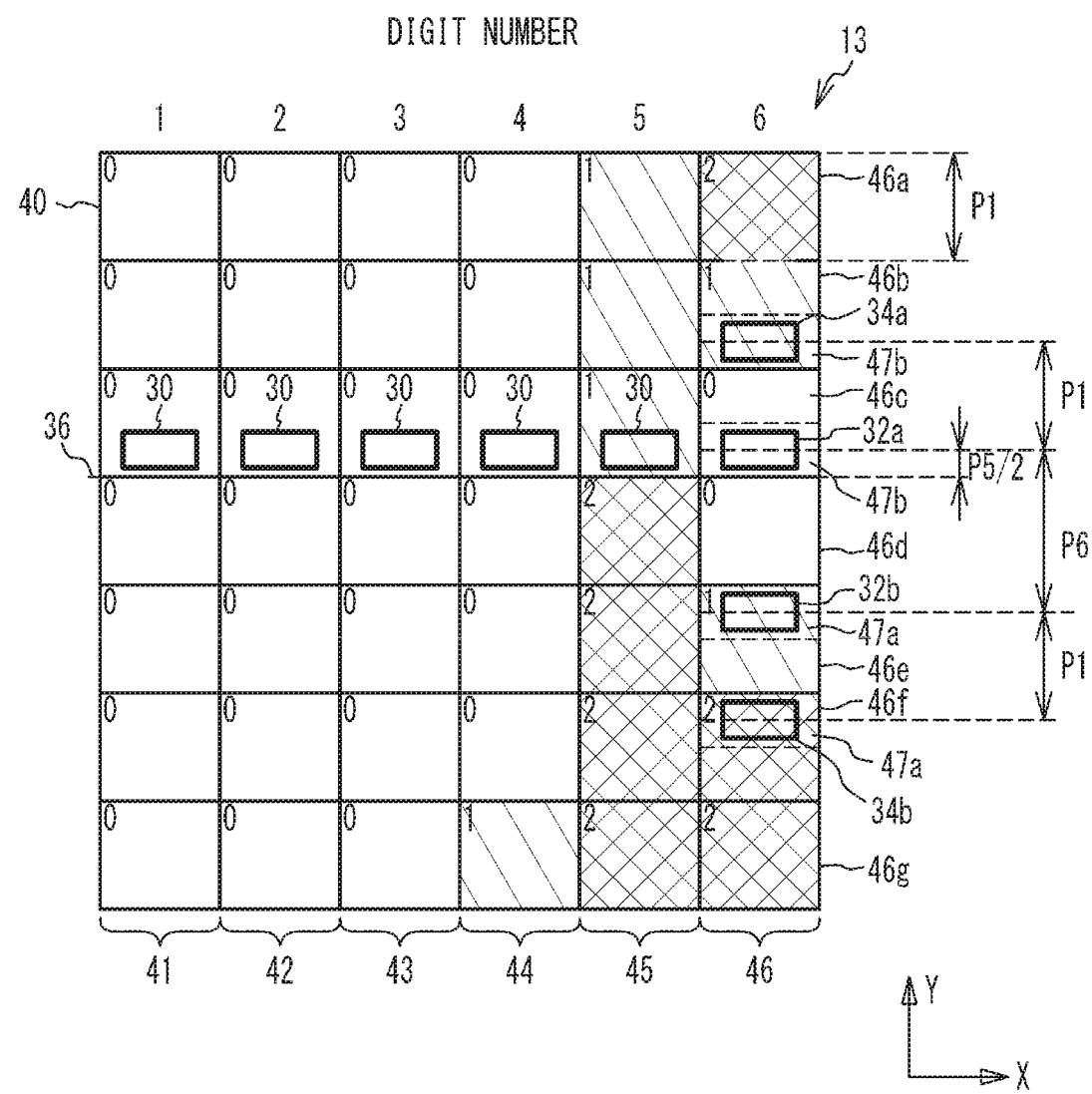
FIG. 18 is an enlarged view of the color pattern according to the second variation of the first embodiment.

FIGS. 17 and 18 are enlarged views of the color pattern according to the second variation. In the example of FIG. 17, the range 32a is located in the region 47b of the pattern 46b, and the range 32b is located in the region 47a of the pattern 46d. In this case, the microcomputer 3 determines that the measurement position 36 is located between the patterns 46b and 46c, from the relationship of the color read in the range 32a and the color read in the range 32b.

In the states of FIGS. 16A and 17, the measurement position 36 of FIG. 17 is shifted from that of FIG. 16A by the width P5, i.e., 2 mm. Therefore, the microcomputer 3 determines whether the measurement position 36 is located on which positions of FIGS. 16 and 17_by relationship between the colors read in the regions 32a and 32b, so that the microcomputer 3 can set the measurement accuracy of the length to a half (i.e., 2 mm) of the width P1 (i.e., 4 mm) of the pattern 40.

Moreover, in the example of FIG. 18, the ranges 34a and 34b are added to the example of FIG. 17. The range 34a to be read by the reader 24a is located away from the range 32a in the +Y direction by the width P1, and the range 34b to be read by a reader 24b is located away from the range 326 in the −Y direction by the width P1. Thereby, even if the two patterns 46 with the same color, patterns 46c and 46d in the example of FIG. 18, are continuous in the Y direction, it is possible to determine the measurement position 36 and realize the measurement accuracy of 2 mm.

As described above, in the second variation, it is possible to measure the length with an accuracy of a half of the width P1 of the pattern.

According to the first embodiment and the first and the second variations, the readers 20 (i.e., first readers) optically read the colors of the ranges 30 (i.e., first ranges) in the patterns 41 to 45 (i.e., first patterns) corresponding to the digits except the least significant digit among the plurality of color patterns 40, respectively. The ranges 30 in the plurality of patterns 41 to 45 are arranged in the X direction.

The readers 22a and 22c (i.e., second readers) optically read the colors of the ranges 32a and 32c (i.e., second ranges) in the patterns 46 (i.e., second patterns) of the least significant digit arranged in the Y direction among the plurality of color patterns 40, respectively. The ranges 32a and 32c are arranged in the Y direction at an interval different from the width P1 of the pattern 40 in the Y direction.

The microcomputer 3 determines the length of the measurement object with an accuracy smaller than the width P1, from the reading result by the readers 20 and 22a and 22c. The operation of the microcomputer 3 to determine the length corresponds to an example of a "determiner". The measurement accuracy is a multiple of the number of readers 22a and 22c. For example, in the first embodiment, the measurement accuracy is ⅓ of the width P1 (resolution ⅓), and in the second variation, the measurement accuracy is ½ of the width P1 (resolution ½). A function of the determiner may be realized in cooperation with a processor such as the microcomputer 3 and software, or may be realized by a dedicated circuit.

Thus, it is possible to improve the measurement accuracy of the length without reducing the width P1 of the color pattern 40 and increasing the number of digits.

The ranges 32a and 32c are arranged on any of the patterns 46a to 46g so as to correspond to the regions 47a to 47c into which one of the patterns 46 is virtually divided in the Y direction, respectively. Thereby, the measurement accuracy of the length can be improved by a multiple of the number of regions 47a to 47c.

Each of the distance between the ranges 32a and 32c and the distance between the ranges 32a and 32c is larger than the width P1. Thereby, it is possible to widen installation intervals between the readers 22a and 22b and between the readers 22b and 22c, and there is no need to reduce the sizes of the readers 22a and 22c. Also, it is possible to suppress interference between the ranges 32a and 32c.

The readers 24a and 24c optically read the colors of the ranges 34a and 34c corresponding to the regions 47a and 47c other than the central region 47b among the regions 47a to 47c, respectively. An interval between the range 34a and the range 32a corresponding to the same region 47a as the range 34a is the width P1. An interval between the range 34c and the range 32c corresponding to the same region 47c as the range 34c is the width P1. The microcomputer 3 determines the length of the measurement object from the reading results by the readers 20, 22a and 22c, 24a and 24c. Thereby, even if the two patterns 46 with the same color of the least significant digit are continuous, it is possible to measure the length accurately.

As described in the first variation, based on the reading results by the readers 20 and a part of the readers 22a and 22c, the microcomputer 3 determines whether remaining readers among the readers 22a and 22c, and the readers 24a and 24c execute the reading. Thereby, it is possible to suppress the consumption of the electric power of the readers.

One of the ranges 32a, 32b and 32c is arranged opposite to the ranges 30 in the X direction. When the number of regions 47a to 47c is odd as in the case of the first embodiment, the range 32b corresponding to the central region 47b among the regions 47a to 47c is arranged opposite to the ranges 30 in the X direction. Also, when the number of regions 47a and 47b is even as in the case of the second variation, the measurement position 36 is shifted from the position of the ranges 30 in the Y direction by approximately ½ of the width P5.

In the first embodiment and the first and the second variations, the description is given of the example that the pattern 46 is virtually divided into two or three regions, but the pattern 46 may be divided into four or more regions as long as it is divided into a plurality of regions. Also, the description is given of the case where the color pattern is the ternary number, but it is sufficient that the color pattern is N-ary number.

In the first embodiment, an optical reader which is the reader unit 2 reads a reading object having the plurality of color patterns, the plurality of color patterns assigned to respective different decimal values are arranged in the Y direction, each of the color patterns has a plurality of patterns 40 corresponding to a plurality of digits arranged in the X direction, and a value of N-ary number is assigned to each of the digits. The readers 20 and 22b are arranged along the X direction, and read patterns 40 corresponding to respective different digits in one of the color patterns. The readers 22a and 22c are arranged opposite to one of the readers 20 and 22b along the Y direction, and read the patterns 40 of the same digit as a digit read by the reader 22b, the patterns 40 of the same digit being included in a color pattern adjacent to a color pattern read by the readers 20 and 22b in the Y direction. Thereby, it is possible to improve the measurement accuracy of the length.

The second readers includes at least one of the readers 22a and 22c that are arranged at positions away from the reader 22b by a distance greater than the width P1, respectively. Thereby, it is possible to improve the measurement accuracy of the length. The optical reader includes the readers 24a and 24c that are arranged at positions away from the readers 22a and 22c by the width P1, respectively. Thereby, it is possible to improve the measurement accuracy of the length.

In the second variation of the first embodiment, the readers 20 and 22a are arranged along the X direction, and read patterns 40 corresponding to respective different digits in one of the color patterns. The reader 22b is arranged opposite to the reader 22a along the Y direction, and read the pattern 40 of the same digit as a digit read by the reader 22a, the pattern 40 of the same digit being included in a color pattern adjacent to a color pattern read by the reader 22a in the Y direction. The reader 22b is arranged at a position away from the reader 22a by 1.5 times of the width P1. Thereby, it is possible to improve the measurement accuracy of the length.

In the above-described embodiments, the measuring instrument 1 outputs the decimal value to the external terminal. However, the measuring instrument may output trinary data, or the actual measured length converted from the read code to the external terminal. When the external terminal receives the ternary data, the external terminal converts the received ternary data into the decimal value and/or into actual measured length.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical reader that reads a reading object having a plurality of color patterns, the plurality of color patterns assigned to respective different values being arranged in a first direction, each of the color patterns having a plurality of patterns corresponding to a plurality of digits arranged in a second direction intersecting the first direction, the optical reader comprising:

a plurality of first readers that are arranged along the second direction, and read patterns corresponding to respective different digits in one of the color patterns; and a plurality of second readers that are arranged along the first direction with respect to only a given first reader of the first readers, and read patterns of the same digit as a digit read by the one of the first readers, the patterns of the same digit being included in a color pattern adjacent to a color pattern read by the first readers in the first direction, wherein a distance along the first direction between one of the first readers and one of the second readers which are adjacent to each other in the first direction and read the patterns of the same digit, respectively, is greater than a distance along the second direction between two of the first readers adjacent to each other in the second direction, and correction is performed on a reading result by the first readers based on a reading result by the second readers.

2. The optical reader as claimed in claim 1, wherein the second readers include at least one of readers that are arranged at positions away from the one of the first readers by a distance greater than a width of one of the color patterns in the first direction, respectively.

3. The optical reader as claimed in claim 2, comprising: a third reader that is arranged at a position away from the at least one of readers by the width of one of the color patterns in the first direction.

4. An optical reader that reads a reading object having a plurality of color patterns, each of the plurality of color patterns assigned to a respective different value being arranged in a first direction, each of the color patterns having a plurality of patterns corresponding to a plurality of digits arranged in a second direction intersecting the first direction, the optical reader comprising:

a plurality of first readers that are arranged along the second direction, and read patterns corresponding to respective different digits in one of the color patterns; and a second reader that is arranged along the first direction with respect to only a given first reader of the first readers, and reads a pattern of the same digit as a digit read by the one of the first readers, the pattern of the same digit being included in a color pattern adjacent to a color pattern read by the first readers in the first direction;

wherein the second reader is arranged at a position away from the one of the first readers by 1.5 times of a width of one of the color patterns in the first direction, and a distance along the first direction between one of the first readers and one of the second readers which are adjacent to each other in the first direction and read the patterns of the same digit, respectively, is greater than a distance along the second direction between two of the first readers adjacent to each other in the second direction, and correction is performed on a reading result by the first readers based on a reading result by the second reader.

\* \* \* \* \*